July 19, 1932.  G. E. WHITE ET AL  1,868,265
PEDAL CONTROL FOR MOTOR CARS
Filed Feb. 25, 1930
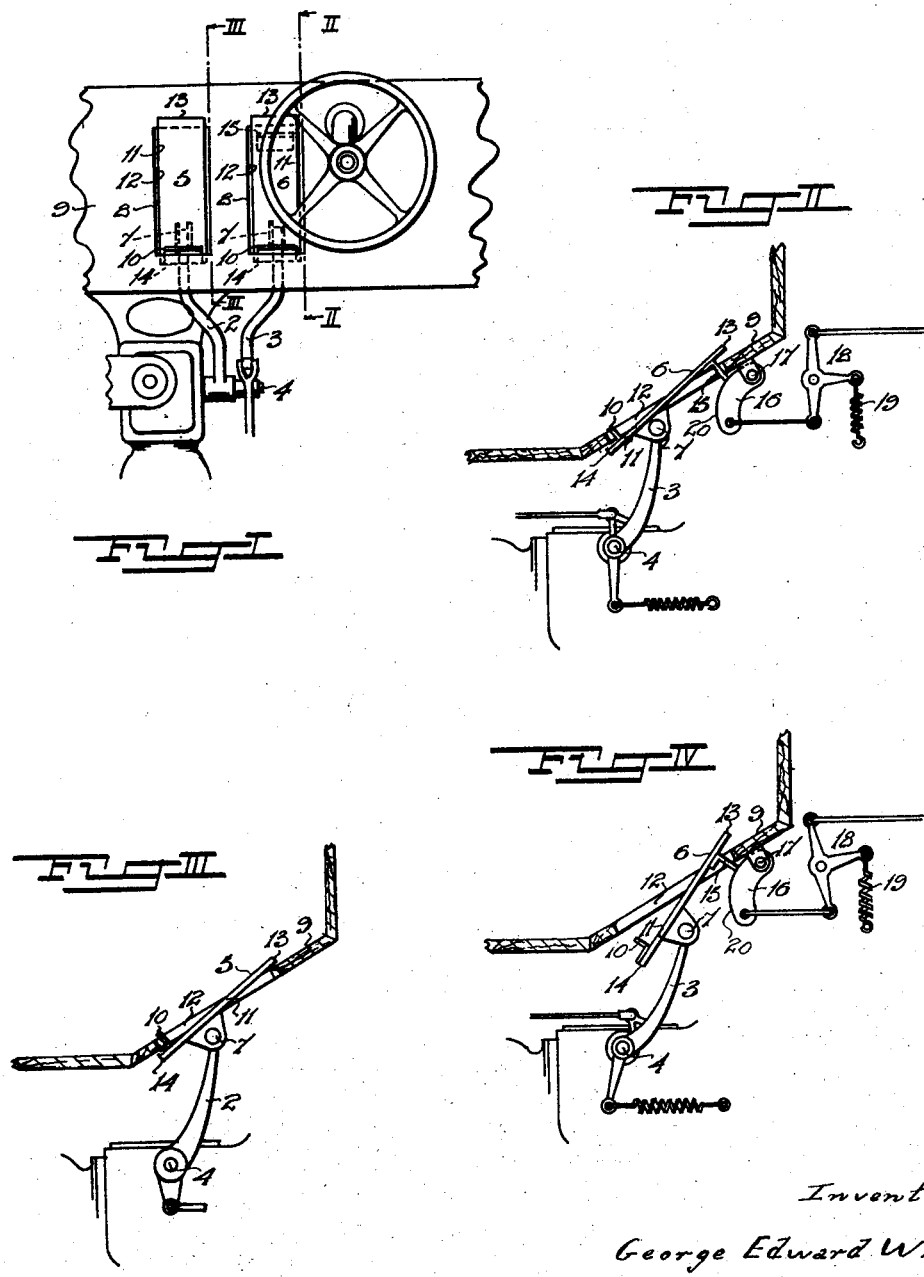
Inventors:
George Edward White
and Charles Neil Harding White
By
Attorney Patented July 19, 1932

1,868,265

UNITED STATES PATENT OFFICE

GEORGE EDWARD WHITE AND CHARLES NEIL HARDING WHITE, OF DOORNFONTEIN, JOHANNESBURG, TRANSVAAL, UNION OF SOUTH AFRICA

PEDAL CONTROL FOR MOTOR CARS

Application filed February 25, 1930, Serial No. 431,204, and in the Union of South Africa January 14, 1930.

The present invention relates to the pedal actuated mechanism for operating the brake, accelerator, and clutch of a motor vehicle. The object of the invention is to make the control of these devices easier and more positive than is the case with present constructions.

With this object in view, the invention provides control pedals, each of appropriate size and shape to form a rest for the whole of the driver's foot and normally sloped to position the foot comfortably at about the usual inclination of the sloped foot board in the driver's compartment of a car; each being pivotally mounted upon a member forming part of the car control mechanism and being movable from its normal position downwardly with said member to operate its associated control mechanism.

The invention also provides a single pedal, such as that described, controlling both the brake and the throttle. This pedal is attached to the usual brake lever arm and moves therewith for applying the brake. The attachment is a pivot joint so that the pedal has tilting movement independent of the brake arm for actuating the throttle mechanism; the arrangement being such that throttle actuating movement is possible in all positions to which the plate may be bodily moved.

The intention is that the driver shall keep his feet on the two pedals, one for the clutch and one for the brake and throttle, so that he is always ready to make any of the necessary movements for controlling the speed of the car.

The invention is illustrated in the accompanying drawing in which

Fig. I is a plan of the floor at the driver's position.

Fig. II is a vertical section on II—II Fig. I.

Fig. III is a vertical section on III—III Fig. I.

Fig. IV is similar to Fig. III but showing the parts in a different position.

2 and 3 indicate respectively the usual clutch and brake pedal arms which are pivotally mounted at 4, the arrangement being that depression of the arm 2 opens the clutch and depression of the arm 3 applies the brakes.

5 and 6 are the pedals formed of plate and attached to their respective arms 2 and 3; the attachment in each case being by a transverse pivot 7 so that the plate can tilt in a fore and aft direction.

Apertures 8 corresponding to the plates are formed in the usual sloping floor board 9 and the pedal plates lie in said apertures approximately parallel with said board so that the driver's feet are in a natural and comfortable position when resting on the pedals. The plates are made rather longer and wider than the normal foot so as wholly to support the foot; and each is provided with a heel rest 10 which prevents the foot from slipping down the plate.

The side edges 11 of the plates clear the side edges 12 of the apertures to enable the plates to move downwardly through the apertures. The ends of the plates overlap the floor boards 9, the front end 13 being above the floor board and the rear end 14 below so that the principal movement of the pedal is largely one of tilting about the front end 13. Accordingly in the case of the clutch pedal 5 the driver can let his foot lie restfully with its weight applied mainly on the ball of the foot, without danger of inadvertently slipping the clutch; whilst at the same time having the foot always ready for instantaneous action by simply depressing it.

The brake pedal 6 normally lies with its forward end 13 raised above the floor board 9 sufficiently for it to have the necessary downward movement for actuating the throttle connection. Its forward end has a downward flange 15 engaging an arm 16 pivoted at 17 and connected to the throttle actuating mechanism 18 in such a way that depression of the front end of the pedal 6 opens the throttle in the same way as depression of the usual separate throttle pedal. The throttle actuating connection is restored in the usual way by a spring 19.

The edge 20 of the arm 16 is preferably curved somewhat as shown so as to be in a position to be engaged by the pedal flange 15 whatever the position to which the pedal is moved with the brake arm 3. Fig. IV for instance shows the throttle being actuated while the pedal is depressed, as is desirable when starting the car uphill.

We claim:

1. In a motor vehicle, the combination with a foot board having an aperture therein of a pivotally mounted pedal movable upwardly and downwardly relative to said aperture, the front end of the pedal overlapping the board above the same and the rear end of the pedal overlapping the board below the same, and a vehicle control means adapted for actuation upon forward titlting movement of said pedal.

2. In a motor vehicle, the combination with the footboard having an aperture therein, of a pivotally mounted pedal movable upwardly and downwardly relative to said aperture, the front end of the pedal overlapping the board above the same and the rear end of the pedal overlapping the board below the same, and vehicle control means adapted for actuation upon depression of said pedal and further control means adapted for actuation upon forward tilting movement of said pedal.

3. In a motor vehicle the combination with a footboard having an aperture therein, of a pivoted brake arm, a pedal pivotally mounted on said arm and movable upwardly and downwardly relatively to said aperture, the front end of the pedal overlapping the floorboard above the same and the rear end of the pedal overlapping the floorboard below the same, said brake arm being adapted for actuation upon depression of said pedal, throttle actuating means comprising a part projecting downwardly from the forward end of the pedal through the footboard aperture in all positions of the pedal, and throttle mechanism comprising a movable member positione to be actuated by contact of said part therewith.

In testimony whereof we affix our signatures.

GEORGE EDWARD WHITE.
CHARLES NEIL HARDING WHITE.